US00RE40013E

(19) United States
(12) Reissued Patent
Quinn

(10) Patent Number: US RE40,013 E
(45) Date of Reissued Patent: Jan. 22, 2008

(54) METHOD AND APPARATUS FOR DETECTION AND REMOTE NOTIFICATION OF VEHICLE PARKING SPACE AVAILABILITY DATA

(76) Inventor: Joseph P. Quinn, 17 Ridge Rd., Norfolk, MA (US) 02056

(21) Appl. No.: 11/501,406

(22) Filed: Aug. 9, 2006

Related U.S. Patent Documents

Reissue of:
(64) Patent No.: 6,927,700
Issued: Aug. 9, 2005
Appl. No.: 09/754,454
Filed: Jan. 4, 2001

U.S. Applications:
(60) Provisional application No. 60/174,320, filed on Jan. 4, 2000.

(51) Int. Cl.
*G08G 1/14* (2006.01)

(52) U.S. Cl. ..... 340/932.2; 340/927; 340/937; 340/942; 340/995; 340/505; 340/506; 340/468; 340/687

(58) Field of Classification Search ..... 340/932.2, 340/927, 937, 942, 995, 505, 506, 468, 687
See application file for complete search history.

(56) References Cited

U.S. PATENT DOCUMENTS 5,293,163 A * 3/1994 Kakihara et al. ..... 340/995
5,432,508 A 7/1995 Jackson ..... 340/932.2
5,748,107 A * 5/1998 Kersken et al. ..... 340/905
5,751,973 A * 5/1998 Hassett ..... 395/213
5,777,951 A * 7/1998 Mitschele et al. ..... 368/90
5,877,704 A * 3/1999 Yoshida ..... 340/932.2
5,910,782 A * 6/1999 Schmitt et al. ..... 340/995
6,037,880 A * 3/2000 Manion ..... 340/932.2
6,107,942 A * 8/2000 Yoo et al. ..... 340/932.2
6,147,624 A * 11/2000 Clapper ..... 340/932.2
6,340,935 B1 * 1/2002 Hall ..... 340/932.2
6,380,851 B1 * 4/2002 Gilbert et al. ..... 340/517
6,501,391 B1 * 12/2002 Racunas, Jr. ..... 340/932.2
6,741,932 B1 5/2004 Groth et al. ..... 701/210
7,026,954 B2 4/2006 Slemmer et al. ..... 340/932.2

* cited by examiner

*Primary Examiner*—Tai Nguyen
(74) *Attorney, Agent, or Firm*—Joseph P. Quinn

(57) ABSTRACT

A method and apparatus for providing timely and efficient notification of vehicle parking space availability and locations of vehicle parking spaces to motorists or other network users. Local detector devices sense the presence or absence of a vehicle in a particular parking space and communicate space identification and status information to a computer network. The parking space status information is integrated with electronic street maps of the area where the relevant spaces are located. Integrated maps containing space status identifiers are communicated to any number of networks.

31 Claims, 1 Drawing Sheet

METHOD AND APPARATUS FOR DETECTION AND REMOTE NOTIFICATION OF VEHICLE PARKING SPACE AVAILABILITY DATA

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority from U.S. Provisional Patent Application No. 60/174,320 filed on Jan. 4, 2000.

FIELD OF THE INVENTION

The present invention relates to a method and apparatus for communicating space availability data and more particularly to a method and apparatus for sensing the presence or absence of vehicles in particular parking spaces and communicating parking space location and status information.

BACKGROUND OF THE INVENTION

Motorists who drive in crowded metropolitan areas often have difficulty locating a vacant space to park their vehicle. During busy traffic hours, most legally marked and metered parking spaces are often occupied. Motorists who are seeking a space are often compelled to repeatedly circle city blocks while waiting for a space to become available. These motorists often obstruct traffic by driving very slowly or frequently stopping in a travel lane to wait for a potential space to open. They also create a substantial hazard to other drivers and pedestrians by focusing their attention on parking spaces thereby reducing their awareness of pedestrians and other normal road hazards.

Mechanical parking meters which have no sensing capability are being replaced in many cities by electronic meters which are capable of sensing the presence or absence of a vehicle in a particular parking space. Any number of known sensor technologies including infra red sensors, ultrasonic sensors, magnetic sensors or machine vision systems may be used to detect the presence or absence of vehicles in particular parking spaces. Electronic modules are known which can be adapted to conventional mechanical parking meters to add a vehicle detecting capability to the meters. For example U.S. Pat. No. 5,966,345 discloses electronic modules which include vehicle sensors for enhancing the operation of conventional parking meters. Electronic parking meters which are capable of sensing the presence or absence of a vehicle can be used to reset a meter when a vehicle leaves a space. Revenue for a municipality is thereby enhanced at the expense of motorists who could otherwise use the previous occupant's remaining meter time.

Electronic parking meters are known that are connected to a network. For example, U.S. Pat. No. 5,029,094 discloses a computerized parking meter system which comprises a host computer and a plurality of parking meters having supersonic metal sensors. These computerized systems detect the presence of vehicles and register parking time so that overtime parking can be accurately recorded. Limited data is provided to a municipality and is used primarily for control and evaluation of parking fine collections. Data that is collected on known parking meter networks is not collected, maintained, or formatted in a manner that could assist motorists to locate parking spaces. Electronic parking meters and networks according to the prior art do not provide timely parking space availability data in a useful format to local motorists.

Electronic databases of street maps of many cities and towns are available to computer users on CD ROM and on the internet. Many available electronic street maps allow users to select various scales or zoom levels to view an area map. The location of a particular address may be graphically indicated on an electronic map by superimposing a symbol such a star at the map location of the particular address. For example MAPQUEST.COM provides an internet web-site wherein a user may enter any address and be provided almost instantly with a detailed street map of the area surrounding the address wherein a star is superimposed on the map to indicate the precise location of the address. Certain electronic maps are available for use on hand held computer devices such as PALM hand held devices, available from Palm, Inc. of Santa Clara, Calif., and vehicle mounted mobile computer systems. Electronic map databases such as those provided by MAPQUEST.COM provide no real-time status information such as parking space availability data.

Electronic street maps have been integrated with vehicle global positioning systems (GPS) to provide accurate real-time vehicle location and navigation information to motorists. For example, U.S. Pat. No. 5,760,742 discloses a graphic mapping system disposed within a vehicle and integrated with an automatic position locating system. U.S. Pat. No. 5,559,520 discloses an information system for automatically providing mobile vehicles with information related to their location. Mobile computer systems having electronic maps and GPS capability are available as standard or optical equipment in several automobile models. Such mobile computer systems are heretofore unable to assist a motorist to find a parking space.

SUMMARY OF THE INVENTION

The present invention relates to a method and apparatus for communicating data relating to the locations and availability status of parking spaces for automobiles. Detector devices that are at least capable of detecting and signaling the presence or absence of a vehicle in a particularly identified space are mounted near any number parking spaces. The detector devices may be integrated with parking meters and may include vehicle detector devices that are included in existing electronic parking meters. The detector devices communicate an availability signal indicating the presence or absence of a vehicle in a specific parking space and an space identification data to a data storage device or database.

According to at least one embodiment of the invention the availability signal in the database is integrated with an electronic map database such that the status of the parking space is graphically indicated on the electronic map. The graphical map having parking availability data is made available to the public and particularly to motorists expeditiously over the internet or any other communication network. Availability data for any number of parking spaces may be displayed on an electronic map.

The present invention features a timely method of notifying the public and particularly motorists of the location of available parking spaces. The method and apparatus according to the invention saves time and provides convenience to motorists. The invention also enhances safety around congested parking areas by allowing drivers to focus on the road rather than scanning for vacant spaces.

BRIEF DESCRIPTION OF THE DRAWINGS

The foregoing and other features and advantages of the present invention will be more fully understood from the following detailed description of illustrative embodiments taken in conjunction with the accompanying drawings in which.

DETAILED DESCRIPTION

Figure 1:
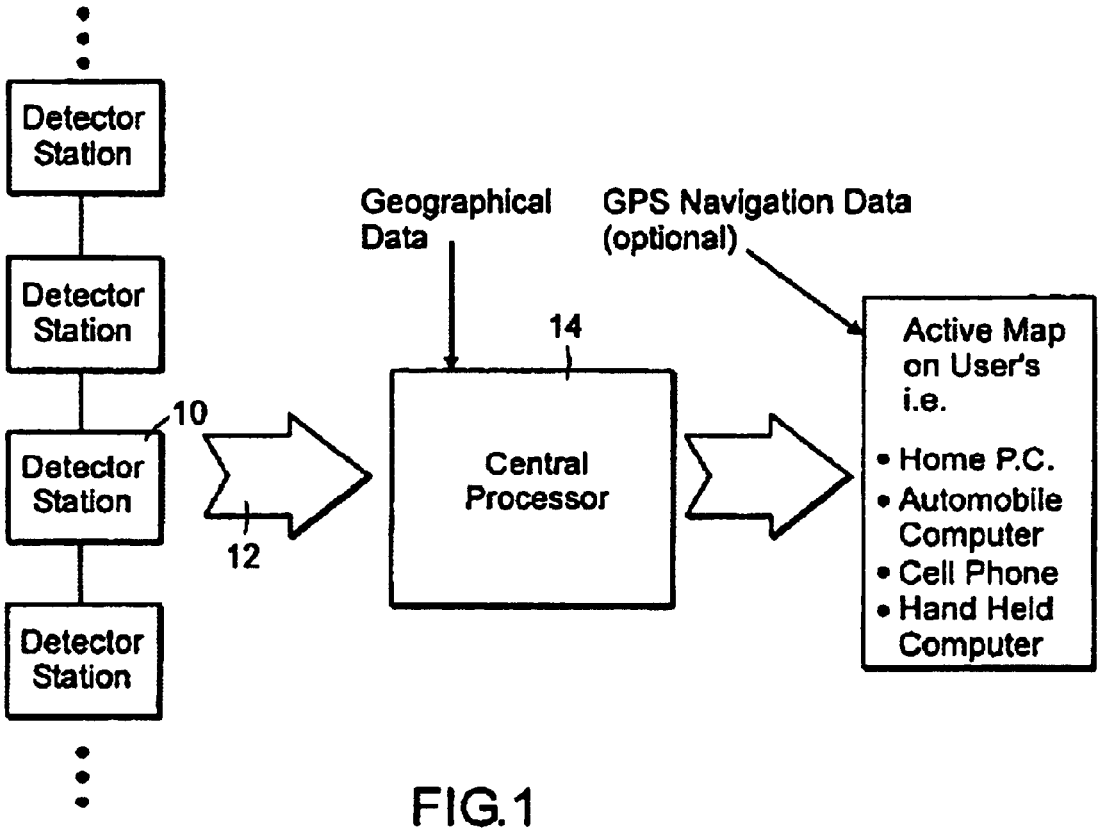
FIG. 1 is a schematic diagram of a parking space detection and notification system according to at least one embodiment of the present invention.

FIG. 1 illustrates an exemplary embodiment of the present invention. One to a plurality of detector stations 10 use any number of appropriate sensor types or technologies to detect the presence or absence of a vehicle in a particular location or space. The detector station generates a space status signal indicating the presence or absence of a vehicle in a particular space and identifying the particular space to which it refers. In the exemplary embodiment, the detector stations 10 communicate space status signals to a central processor component 14 via a communication link 12. The central processor component 14 may retrieve map data from an external source such as the internet or a separate communication link or may be preloaded or programmed to internally store a database of map data The central processor component, 14 is programmed to integrate space status signals with map data according to any means known in the art so that space availability indicators are displayed on the map at locations corresponding the actual space locations. The integrated map data is continuously updated to maintain realtime parking status information and is published to any number of communication networks such as by posting the integrated map to a web-page on the internet.

Figure 2:
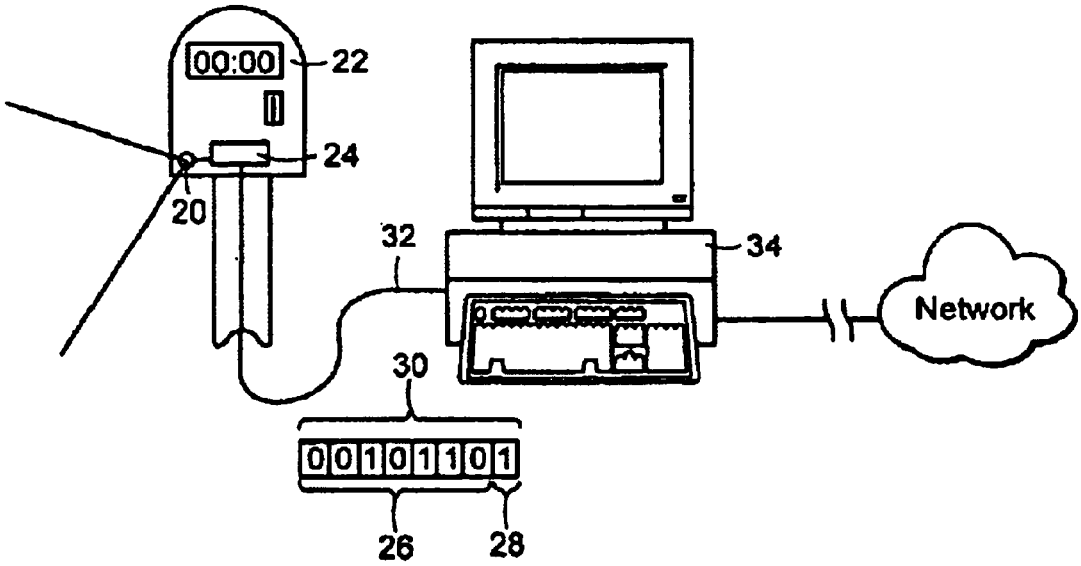
FIG. 2 is a functional block diagram of a parking meter based sensor and notification system according to at least one embodiment of the present invention.

In an exemplary embodiment of the present invention as illustrated in FIG. 2, an ultrasonic metal sensor 20 is mounted in each parking meter 22 of an area and detects the presence or absence of a vehicle in the space associated with its respective meter. Each metal sensor 20 outputs an electrical signal such an analog voltage signal or a digital signal to a data acquisition circuit 24 within the meter. The data acquisition circuit 24 typically includes a simple microprocessor system which reads and interprets a signal from the metal sensor and appends it to a space identifier. If the sensor outputs analog information, the data acquisition circuit may include an analog/digital converter to generate a digital signal representing the presence or absence of a vehicle in a space. The digital signal representing the presence or absence of a vehicle may comprise a single data bit 28 that is appended to or included in a byte or word address 26 of the particular meter. The combined space status 28 and space identifier data 26 will hereinafter be referred to as the "space data" 30. In the illustrative embodiment of FIG. 2, the data acquisition circuit 24 writes the space data 30 to an output port. A transmission cable 32 connects the output port of each meter 22 to a central processor component 34.

The central processor component 34 may comprise a general purpose computer that is in communication with a network. In the illustrative embodiment, the central processor component 34 is a general purpose computer that is in communication with the internet. The central processor component 34 is programmed to continuously and repeatedly poll all of the meter port connections and read the space data 30 from each meter 22 into a database. In an alternative embodiment, the data acquisition circuit 24 is programmed to transmit information only upon a status change and the central processor component 34 updates the status database upon state changes. In the illustrative embodiment, the central processor component also includes memory which is pre-loaded with a detailed map database having sufficient detail to provide close up graphical street maps. The central processor component 34 integrates the space data with the map data using any number of methods known in the art to generate an integrated map database capable of being interpreted by standard computer systems for displaying graphical indicators of parking space status at the location of each space on the electronic street map. The integrated map data is translated to any format that is appropriate for communication over a particular network and communicated to the network.

In one embodiment of the present invention, a user may input a specific location and radius of interest. The system according to this embodiment will select the appropriate map section according to the user's request and transmit the appropriate integrated map to the user via the internet. In another embodiment a user having a GPS locating device in her vehicle is provided with an integrated map for a preselected radius around the actual location of the vehicle without requiring manual input of the location of interest. In such an embodiment, for example, the central processor component would receive location information automatically from the GPS locating device in the vehicle and transmit an appropriate map section to the network that is in communication with the vehicle navigation system.

In still another embodiment of the present invention, the central processor system is programmed to transmit an alert signal, such as an audible beep and/or a flashing map indicator to a user when a status change occurs such as an occurrence of a newly available space in the user's area of interest.

Although embodiments according to the invention having ultrasonic metal detectors have been disclosed herein, it will be understood by persons skilled in the art that sensors for detecting an automobile in a parking space are available in a variety of types and using a variety of technologies. For example a detector station according to the invention may include photoelectric or magnetic sensors, supersonic metal sensors or complex machine vision systems that are capable of distinguishing various types of vehicles. Any type detection signal is encoded using any means known in the art and transmitted over a communication link.

The communication links to each detector station may comprise simple wire conductors or any other communication medium or combination thereof including radio frequency, microwave, fiber optic cable or coaxial cable. Appropriate encoding and transmission circuitry as known in the art for the particular communication medium is placed in communication with the data acquisition circuit and communicates to the central processor component or directly to an end user's communication system.

Although the invention has been described herein as including a central processing component, it should be recognized by those skilled in the art that the step of integrating space data with map data may be performed remotely by an appropriately programmed end user computer. For example, map data may be stored locally on the end user's computer so that communication of only space data is necessary. Updated space data may be continuously communicated or alternatively, updates may be communicated upon an end user's request.

Integrated electronic maps according to the invention may indicate only available parking spaces or-may indicate all parking spaces where vacant spaces are graphically distinguishable from occupied spaces. For example, vacant spaces may be indicated at their appropriate location on a map by a green rectangle and an occupied spaces may be indicated at their appropriate location on a map by a red rectangle. Alternatively an automobile shaped graphic symbol may be used to indicate occupied spaces and a hollow rectangle used to indicate vacant spaces. Flashing symbols and audible signals may be transmitted according to various embodiments of the present invention to highlight particular parking spaces, for example when a space first becomes available. Any graphical indication of space data may be integrated with map data according to the invention by means known in the art.

Although the invention has been described herein as a graphical system, persons skilled in the art will recognize that the invention may also be practiced using a text based data system or even a voice based data system. For example, wireless web access devices that are widely available having small text based output screens may be used according to the invention to query the database of space data and retrieve text based space availability data. Such systems may include database elements that associate particular space identifiers with landmarks or addresses. In another example, a voice or tone based query may be performed according to the invention by making a telephone call to an appropriately programmed computer having a communication link with the database of space data. A user knowing the identifiers or addresses of specific spaces may query the database by verbally stating the identifier or entering an space identifier on a telephone keypad.

Although the invention has been shown and described with respect to exemplary embodiments thereof, various other changes, omissions and additions in the form and detail thereof may be made therein without departing from the spirit and scope of the invention.

What is claimed is:

1. A parking space locating system comprising:

at least one vehicle detector disposed proximately to an associated parking space and configured to output an occupied/vacant signal along with an associated space identifier according to whether said vehicle detector detects that a vehicle is present/absent in/from said associated parking space respectively;

a central processor in communication with said at least one vehicle detector via at least one communication link;

wherein said central processor is programmed to receive at least one of said occupied/vacancy signals along with said associated space identifiers and maintain an updated database of said occupied/vacant signals along with associated space identifiers, wherein said central processor integrates said database with geographical map data including a geographical area of said parking space(s) and generates an electronic street map which is capable of being displayed on a standard computer device screen as a graphical map, said graphical map having sufficient detail to distinguish individual parking spaces, wherein said occupied/vacant signal is indicated at a corresponding location on said graphical map;

wherein said central processor is further programmed and configured to quickly communicate updated graphical map data structures including updated occupied/vacant signal indication to a network.

2. The system according to claim 1 wherein said network comprises a publicly accessible network.

3. The system according to claim 1 wherein said network includes an internet.

4. The system according to claim 1 wherein said at least one vehicle detector is disposed in a parking meter.

5. The system according to claim 1 wherein said at least one communication link is an electrical transmission line.

6. The system according to claim 1 wherein said at least one communication link is a microwave link.

7. The system according to claim 1 wherein said at least one communication link is a fiber optic link.

8. The system according to claim 1 wherein said at least one vehicle detector is an ultrasonic metal detector.

9. A method of notifying motorists of vacant parking space locations comprising the steps of:

detecting the presence or absence of a vehicle in at least one identifiable parking space;

generating a signal to represent the presence or absence of the vehicle in said at least one identifiable parking space;

associating said signal with a respective space identifier;

interpreting said signal along with said respective space identifier as space identifier data;

integrating said space identifier data with digital street-map data describing an area including said at least one identifiable parking space to form an active street-map;

wherein said active street-map is capable of being interpreted by standard computer systems for displaying geographical indicators of parking space status at space locations on an electronic street map; and communicating said active street-map to a network.

10. The method according to claim 9 further comprising the steps of:

communicating said active street map to a mobile-accessible network;

determining a user's location using GPS information;

displaying an active-street map of an area including the user's position.

11. The method according to claim 9 further comprising the steps of:

periodically updating said active street-map by repeating said step of interpreting said signal along with said respective space identifier as space identifier data; and repeating said step of integrating said space identifier data with digital street-map data describing an area including said at least one identifiable parking space to form an active street-map.

*12. The method according to claim 9 wherein said standard computer device belongs to the group consisting of personal computers, cell phones, and hand held computers (PDAs).*

*13. The method according to claim 9 wherein said standard computer device is a cell phone.*

*14. A parking space locating system comprising:*

*at least one vehicle detector disposed proximately to an associated parking space and configured to output an occupied/vacant signal along with an associated space identifier according to whether said vehicle detector detects that a vehicle is present/absent in/from said associated parking space respectively; and*

*a central processor in communication with said at least one vehicle detector via at least one communication link;*

*wherein said central processor is programmed to receive at least one of said occupied/vacancy signals along*

*with said associated space identifiers and maintain an updated database of said occupied/vacant signals along with associated space identifiers,*

*wherein said central processor integrates said database with geographical map data including a geographical area of said parking space(s) and generates an electronic street map which is capable of being accessed on a standard computer device, wherein said occupied/vacant signal is indicated at a corresponding location on said graphical map.*

*15. The system according to claim 14:*

*wherein said central processor is further programmed and configured to communicate updated graphical map data structures including updated occupied/vacant signal indication to a network.*

*16. The system according to claim 15 wherein said network is in communication with at least one device selected from the group consisting of cell phones, handheld computers, and personal computers and automobile computers.*

*17. The system according to claim 15 wherein said standard computer device comprises a cell phone in communication with said network.*

*18. The system according to claim 15 wherein said network comprises a wireless communication network.*

*19. A parking space locating system comprising:*

*at least one vehicle sensor in communication with a central processor, said sensor being configured to detect parking space vacancies and communicate information identifying said vacancies at a geographic location associated with said sensor to said central processor;*

*wherein said central processor combines said information with geographical data to generate a remotely accessible geographical map database including said parking space vacancy information.*

*20. The system according to claim 19 wherein said central processor is configured to transmit an alert signal when a parking space status change is detected.*

*21. The system according to claim 19 further comprising a user's device in communication with said central processor and configured to display text information corresponding to said geographical database.*

*22. The system according to claim 19 further comprising a user's device in communication with said central processor and configured to transmit a text based query to said central processor and retrieve text based parking space availability data.*

*23. The system according to claim 19 further comprising a user's device in communication with said central processor and configured to receive voice information corresponding to said updated geographical database.*

*24. The system according to claim 19 further comprising a user's device in communication with said central processor and configured to transmit a voice based query to said central processor and receive voice base space availability data from said central processor.*

*25. The parking space locating system of claim 19 wherein said central processor communicates said geographical database to a user's device over a communication network.*

*26. The system according to claim 25 wherein said user's device is selected from the group consisting of personal computers, handheld computers, and cell phones.*

*27. A method for communicating parking space availability information comprising:*

*receiving information identifying a location of at least one vacant parking space;*

*combining said information with geographical map data to generate a geographical map database including parking space vacancy information;*

*communicating said geographical map database to a remotely located user for viewing as geographical street map indicating vacant parking spaces.*

*28. The method of claim 27 wherein said communicating is performed over a communication network.*

*29. The method according to claim 27 further comprising communicating voice information to a said user, said voice information corresponding to said geographical map data including parking space vacancy information.*

*30. The method according to claim 27 further comprising determining a location of said user and communicating said updated geographical map data corresponding to said location.*

*31. A parking space locating system comprising:*

*at least one vehicle sensor in communication with a central processor, said sensor being configured to detect parking space vacancies and communicate information identifying said vacancies at a geographic location associated with said sensor to said central processor;*

*wherein said central processor combines said information with geographical data to generate a remotely accessible geographical database including said parking space vacancy information; and*

*wherein said central processor communicates said parking vacancy information in said geographical database to a user's device over a communication network.*

* * * * *